United States Patent
Choi et al.

(10) Patent No.: US 9,011,709 B2
(45) Date of Patent: Apr. 21, 2015

(54) ELECTROLYTE COMPOSITION AND ENERGY STORAGE DEVICE INCLUDING THE SAME

(71) Applicant: Samsung Electro-Mechanics Co., Ltd., Suwon-si (KR)

(72) Inventors: Jae Hoon Choi, Suwon-si (KR); Ji Sung Cho, Suwon-si (KR); Eun Sil Kim, Suwon-si (KR); Se Woong Paeng, Suwon-si (KR); Bae Kyun Kim, Suwon-si (KR)

(73) Assignee: Samsung Electro-Mechanics Co., Ltd., Suwon, Gyeonggi-Do (KR)

( * ) Notice: Subject to any disclaimer, the term of this patent is extended or adjusted under 35 U.S.C. 154(b) by 97 days.

(21) Appl. No.: 13/843,120

(22) Filed: Mar. 15, 2013

(65) Prior Publication Data
US 2014/0160631 A1 Jun. 12, 2014

(30) Foreign Application Priority Data

Dec. 6, 2012 (KR) .......................... 10-2012-0141244

(51) Int. Cl.
*H01G 11/60* (2013.01)
(52) U.S. Cl.
CPC ..................... *H01G 11/60* (2013.01)
(58) Field of Classification Search
USPC .................. 252/62.2; 361/503; 429/330, 326
See application file for complete search history.

(56) References Cited

U.S. PATENT DOCUMENTS

| 3,829,330 | A  | * | 8/1974 | Dey .............................. 429/105 |
| 5,716,728 | A  | * | 2/1998 | Smesko et al. .................. 429/60 |
| 6,436,582 | B1 | * | 8/2002 | Hamamoto et al. .......... 429/340 |
| 7,314,514 | B2 | * | 1/2008 | Drummond et al. .......... 106/311 |
| 7,675,737 | B1 | * | 3/2010 | Smith et al. ................... 361/523 |
| 2004/0096747 | A1 | * | 5/2004 | Schwake ....................... 429/326 |
| 2008/0304207 | A1 | * | 12/2008 | Brandon et al. .............. 361/502 |

FOREIGN PATENT DOCUMENTS

| JP | 52-71630 | * | 6/1977 |
| JP | 2000-124077 | * | 4/2000 |
| JP | 2000-124077 A |  | 4/2000 |
| KR | 2009-0099980 A |  | 9/2009 |
| KR | 2010-0082494 A |  | 7/2010 |

OTHER PUBLICATIONS

Translation for JP 2000-124077, Apr. 2000.*

* cited by examiner

*Primary Examiner* — Carol M Koslow
(74) *Attorney, Agent, or Firm* — McDermott Will & Emery LLP

(57) ABSTRACT

The present invention relates to an electrolyte of an energy storage device. An electrolyte composition in accordance with an embodiment of the present invention includes an electrolyte salt, a carbonate solvent, and at least one nitrile solvent of acetonitrile and propionitrile.

16 Claims, 1 Drawing Sheet

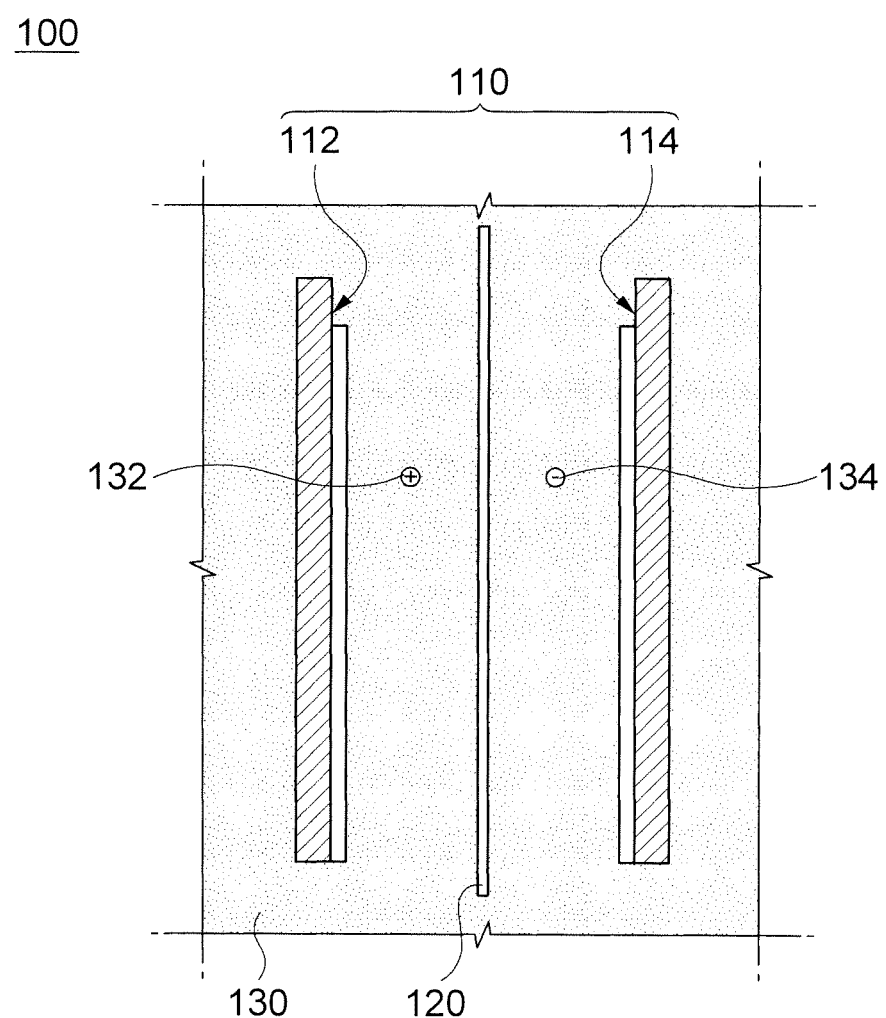

ELECTROLYTE COMPOSITION AND ENERGY STORAGE DEVICE INCLUDING THE SAME

CROSS-REFERENCE TO RELATED APPLICATIONS

Claim and incorporate by reference domestic priority application and foreign priority application as follows:

CROSS REFERENCE TO RELATED APPLICATION

This application claims the benefit under 35 U.S.C. Section 119 of Korean Patent Application Serial No. 10-2012-0141244, entitled filed Dec. 6, 2012, which is hereby incorporated by reference in its entirety into this application.

BACKGROUND OF THE INVENTION

1. Field of the Invention

The present invention relates to an electrolyte composition and an energy storage device including the same, and more particularly, to an electrolyte composition and an energy storage device including the same that can improve output and life characteristics.

2. Description of the Related Art

Among next generation energy storage devices, a device called an ultracapacitor or a supercapacitor has been highlighted as a next generation energy storage device due to high charging and discharging speed, high stability, and eco-friendly characteristics. Currently, as the representative supercapacitors, there are a lithium ion capacitor (LIC), an electric double layer capacitor (EDLC), a pseudocapacitor, a hybrid capacitor, etc.

An electrolyte composition of the LIC is prepared by dissolving a lithium salt such as $LiPF_6$ in a carbonate non-aqueous solvent. For the effective dissolution of the lithium salt, a high permittivity solvent such as ethylene carbonate (EC) or propylene carbonate (PC) should be used. However, this cyclic carbonate solvent is solid or very viscous at room temperature. Therefore, generally, a mixed solvent of a cyclic carbonate solvent and a linear carbonate solvent having relatively low permittivity and low viscosity is used.

RELATED ART DOCUMENT

Patent Document

Patent Document 1: Korean Patent Laid-Open No. 10-2009-0099980

SUMMARY OF THE INVENTION

The present invention has been invented in order to overcome the above-described problems and it is, therefore, an object of the present invention to provide an electrolyte composition that can improve output, capacity, and cycle life characteristics of an energy storage device.

It is another object of the present invention to provide an energy storage device with improved output, capacity, and cycle life characteristics.

In accordance with one aspect of the present invention to achieve the object, there is provided an electrolyte composition including: an electrolyte salt, a carbonate solvent, and at least one nitrile solvent of acetonitrile and propionitrile.

In accordance with an embodiment of the present invention, the content of the nitrile solvent may be 30 to 90 wt % based on the total mixed solvent included in the electrolyte composition.

In accordance with an embodiment of the present invention, the carbonate solvent may include a cyclic carbonate solvent.

In accordance with an embodiment of the present invention, the carbonate solvent may be a cyclic carbonate solvent, and the content of the cyclic carbonate solvent may be 10 to 70 wt % based on the total mixed solvent included in the electrolyte composition.

In accordance with an embodiment of the present invention, the carbonate solvent may include ethylene carbonate and propylene carbonate, wherein a mixing ratio of the ethylene carbonate and the propylene carbonate may be 1:1 to 8:1.

In accordance with an embodiment of the present invention, the electrolyte salt may include at least one of a lithium salt and an ammonium salt.

In accordance with an embodiment of the present invention, the electrolyte salt may include a lithium salt and an ammonium salt, wherein a mixing ratio of the lithium salt and the ammonium salt may be 5:5 to 9:1.

In accordance with an embodiment of the present invention, the electrolyte salt may include a lithium salt and an ammonium salt, wherein the concentration of the lithium salt and the ammonium salt may be 0.1 to 2.0M based on the electrolyte.

In accordance with an embodiment of the present invention, the lithium salt may include at least one of $LiPF_6$, $LiBF_4$, $LiSbF_6$, $LiAsF_5$, $LiClO_4$, $LiCF_3SO_3$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, $(CF_2)_2(SO_2)_2NLi$, and $(CF_2)_3(SO_2)_2NLi$.

In accordance with an embodiment of the present invention, the ammonium salt may include at least one of tetraethyl ammonium tetrafluoroborate (TEABF4), triethylmethyl ammonium tetrafluoroborate (TEMABF4), diethyldimethyl ammonium tetrafluoroborate (DEDMABF4), diethyl-methyl-methoxyethyl ammonium tetrafluoroborate (DEMEBF4), spirobipyrrolidinium tetrafluoroborate (SBPBF4), and spiropiperidinepyrrolidinium tetrafluoroborate (SPPBF4).

In accordance with another aspect of the present invention to achieve the object, there is provided an energy storage device including: a cathode, an anode, and an electrolyte composition, wherein the electrolyte composition includes an electrolyte salt, a carbonate solvent, and at least one nitrile solvent of acetonitrile and propionitrile.

In accordance with an embodiment of the present invention, the content of the nitrile solvent may be 30 to 90 wt % based on the total mixed solvent included in the electrolyte composition.

In accordance with an embodiment of the present invention, the carbonate solvent may include a cyclic carbonate solvent.

In accordance with an embodiment of the present invention, the carbonate solvent may be a cyclic carbonate solvent, and the content of the cyclic carbonate solvent may be 10 to 70 wt % based on the total mixed solvent included in the electrolyte composition.

In accordance with an embodiment of the present invention, the carbonate solvent may include ethylene carbonate and propylene carbonate, wherein a mixing ratio of the ethylene carbonate and the propylene carbonate may be 1:1 to 8:1.

In accordance with an embodiment of the present invention, the electrolyte salt may include at least one of a lithium salt and an ammonium salt.

In accordance with an embodiment of the present invention, the electrolyte salt may include a lithium salt and an ammonium salt, wherein a mixing ratio of the lithium salt and the ammonium salt may be 5:5 to 9:1.

In accordance with an embodiment of the present invention, the electrolyte salt may include a lithium salt and an ammonium salt, wherein the concentration of the lithium salt or the ammonium salt may be 0.1 to 2.0M based on the electrolyte.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a view showing an energy storage device in accordance with an embodiment of the present invention.

DETAILED DESCRIPTION OF THE PREFERABLE EMBODIMENTS

Advantages and features of the present invention and methods of accomplishing the same will be apparent by referring to embodiments described below in detail in connection with the accompanying drawings. However, the present invention is not limited to the embodiments disclosed below and may be implemented in various different forms. The exemplary embodiments are provided only for completing the disclosure of the present invention and for fully representing the scope of the present invention to those skilled in the art. Like reference numerals refer to like elements throughout the specification.

Terms used herein are provided to explain embodiments, not limiting the present invention. Throughout this specification, the singular form includes the plural form unless the context clearly indicates otherwise. Further, terms "comprises" and/or "comprising" used herein specify the existence of described shapes, numbers, steps, operations, members, elements, and/or groups thereof, but do not preclude the existence or addition of one or more other shapes, numbers, operations, members, elements, and/or groups thereof.

Hereinafter, an electrolyte composition and an energy storage device including the same in accordance with embodiments of the present invention will be described in detail.

FIG. 1 is a view showing an energy storage device in accordance with an embodiment of the present invention. Referring to FIG. 1, an energy storage device 100 in accordance with an embodiment of the present invention may include an electrode structure 110, a separator 120, and an electrolyte composition 130.

The electrode structure 110 includes an anode 112 and a cathode 114. The anode 112 and the cathode 114 exchange a carrier ion, which is a medium of electrochemical reaction, through the electrolyte composition 130. The anode 112 may have an active material including a carbon material capable of adsorbing and desorbing a lithium ion. As an example, the anode 112 may have a current collector applied with an active material including graphite. The cathode 114 may have a current collector applied with an active material including activated carbon.

The separator 120 is disposed between the anode 112 and the cathode 114 to electrically separate the anode 112 and the cathode 114. The separator 120 may be at least one of non-woven fabric, poly tetra fluorethylene (PTFE), porous film, Kraft paper, cellulose electrolytic paper, rayon fiber, and other various types of sheets.

The electrolyte composition 130 may be used as a moving medium of a cation 132 and an anion 134 between the anode 112 and the cathode 114. The electrolyte composition 130 may be prepared by dissolving an electrolyte in a predetermined solvent. As an example, the electrolyte composition 130 may include an electrolyte salt including two or more electrolyte salts, a cyclic carbonate solvent, and a nitrile solvent.

The electrolyte salt may include a first electrolyte salt and a second electrolyte salt. The first electrolyte salt may include the cation 132 having a charging reaction mechanism intercalated inside the anode 112 and the cathode 114, and the second electrolyte salt may include the cation 132 having a charging and discharging reaction mechanism adsorbed and desorbed on the surface of the anode 112 and the cathode 114. As an example, the first electrolyte salt may include a lithium electrolyte salt (hereinafter, referred to as 'lithium salt'), and the second electrolyte salt may include a non-lithium electrolyte salt.

The lithium salt may be a salt including a lithium ion (Li+) as a carrier ion between the anode 112 and the cathode 114 during charging and discharging operations of the energy storage device 100. The lithium salt may be at least one of LiPF6, LiBF4, LiSbF6, LiAsF5, LiClO4, LiCF3SO3, LiN(SO2CF3)2, LiN(SO2C2F5)2, LiC(SO2CF3)3, LiPF4(CF3)2, LiPF3(C2F5)3, LiPF3(CF3)3, LiPF3(iso-C3F7)3, LiPF5(iso-C3F7), (CF2)2(SO2)2NLi, and (CF2)3(SO2)2NLi.

The non-lithium electrolyte salt may include an ammonium cation ($NR_4^+$). For example, the non-lithium electrolyte salt (hereinafter, referred to as 'ammonium salt') may include at least one of tetraethyl ammonium tetrafluoroborate (TEABF4), triethylmethyl ammonium tetrafluoroborate (TEMABF4), diethyldimethyl ammonium tetrafluoroborate (DEDMABF4), diethyl-methyl-methoxyethyl ammonium tetrafluoroborate (DEMEBF4), spirobipyrrolidinium tetrafluoroborate (SBPBF4), and spiropiperidinepyrrolidinium tetrafluoroborate (SPPBF4).

Meanwhile, since the lithium salt has relatively high solution stability, it can contribute to increases in charging and discharging driving voltages of the energy storage device 100. Further, the lithium ion ($Li^+$) may be used as a carrier ion of a charging and discharging mechanism intercalated inside the anode 112 and the cathode 114. Therefore, the lithium salt can contribute to increases in capacity and energy density of the energy storage device 100 compared to the non-lithium electrolyte salt having a reaction mechanism by physical adsorption and desorption of charges.

Further, charging and discharging speed of the ammonium ion ($NH_4^+$) is relatively higher than that of the lithium salt since accumulation and emission of charges are performed by physical adsorption and desorption of ions on the surface of the anode 112 and the cathode 114. Accordingly, the ammonium salt can contribute to improvement in charging and discharging efficiency of the energy storage device 100. Further, since the ammonium salt doesn't contract and expand by intercalation and deintercalation of the electrode, the energy storage device 100 including the ammonium salt can have a long life compared to an energy storage device including only a lithium electrolyte. Therefore, when using both of the lithium salt and the ammonium salt, since the amount of lithium salt used is relatively reduced so that the amount of hydrolysis of lithium is reduced, it is possible to prevent deterioration of characteristics of the energy storage device 100 due to the lithium salt and improve output, capacity, and cycle life characteristics.

The concentration of the lithium salt and the ammonium salt may be adjusted variously. The concentration of the lithium salt and the ammonium salt may be about 0.1 to 2.0M, preferably about 0.3 to 1.5M. When the concentration of the lithium salt and the ammonium salt is less than 0.1M, a function as an electrolyte may not be implemented. On the contrary, when the concentration of the lithium salt and the ammonium salt exceeds 2.0M, the rise in solubility and conductivity of the electrolyte is saturated, thus deteriorating characteristics of a cell and increasing manufacturing costs of the cell.

Further, in the electrolyte composition 130, a relative content ratio of the lithium salt and the non-lithium salt may be variously adjusted according to types and applications of the energy storage device to be applied. For example, when the energy storage device is used in the field in which output characteristics are emphasized, it may be preferred to relatively increase a molar concentration of the ammonium salt, and when the energy storage device is used in the field in which capacity characteristics are emphasized, it may be preferred to relatively increase a molar concentration of the lithium salt. When the content of the lithium salt in the electrolyte is small compared to the mixing ratio reference, the capacity of the energy storage device may be reduced. In particular, when the energy storage device is a lithium ion capacitor (LIC), the irreversible capacity of the electrode may be increased and the solution stability of the energy storage device may be deteriorated due to consumption of lithium ions caused by initial SEI film formation during initial charging and discharging. On the contrary, when the content of the lithium salt in the electrolyte composition is larger than the ratio reference, since the ion conductivity of the electrolyte is generally low when using the lithium salt compared to the case when using the ammonium salt, the output characteristics of the energy storage device also may be deteriorated.

The carbonate solvent may be cyclic carbonate having relatively high permittivity and viscosity. The cyclic carbonate may be at least one of ethylene carbonate (EC), propylene carbonate (PC), butylene carbonate (BC), and vinyl ethylene carbonate (VEC).

The nitrile solvent may have lower viscosity than the cyclic carbonate and higher permittivity than linear carbonate. Since the cyclic carbonate is solid or very viscous at room temperature, it is difficult to use only the cyclic carbonate as a solvent for dissolution of the electrolyte. Therefore, a mixed solvent of cyclic carbonate and a relatively low viscosity solvent is used, but since the linear carbonate used at this time has remarkably low permittivity, functions of the electrolyte composition may be deteriorated. Therefore, when using the nitrile solvent having high permittivity and remarkably low viscosity instead of the linear carbonate, it is possible to effectively dissolve the electrolyte and improve the functions of the electrolyte composition. The nitrile solvent may be one of acetonitrile and propionitrile.

The detailed contents of the above solvents may be adjusted variously. As for the cyclic carbonate, a mixing ratio of ethylene carbonate and propylene carbonate may be adjusted to 1:1 to 8:1. At this time, it may be preferred that the total content of the carbonate solvent among the solvents constituting the electrolyte is about 10 to 70 wt % based on the total mixed solvent composition. In using a mixture of ethylene carbonate and propylene carbonate, when the content of the propylene carbonate, which is relatively thermally and electrochemically unstable, exceeds 1:1 compared to the ethylene carbonate, the life characteristics may be deteriorated and gas generation is increased. In contrast, when the content of the propylene carbonate is less than 8:1 compared to the ethylene carbonate, the life characteristics may be deteriorated on the contrary since the formation efficiency of the SEI film for initially protecting the electrode is not good.

Further, the content of the nitrile solvent may be about 30 to 90 wt % based on the total mixed solvent composition constituting the electrolyte. When the content of the nitrile solvent is less than 30 wt %, the viscosity of the electrolyte may be increased, the conductivity of the electrolyte may be reduced, and the low temperature and life characteristics of the electrolyte may be deteriorated. On the contrary, when the content of the nitrile solvent exceeds 90 wt %, since the content of the carbonate component contributing to the formation of the SEI film of the electrode is relatively small in the mixed solvent constituting the electrolyte, the life characteristics may be deteriorated and swelling of the cell due to a rise in vapor pressure at a high temperature.

Here, although it is described that the solvent in accordance with the above-described embodiment of the present invention is the mixed solvent of the cyclic carbonate and the nitrile solvent, a linear carbonate solvent may be selectively further added to the solvent. The linear carbonate may be at least one of dimethyl carbonate (DMC), ethylmethyl carbonate (EMC), diethyl carbonate (DEC), methylpropyl carbonate (MPC), dipropyl carbonate (DPC), methylbutyl carbonate (MBC), and dibutyl carbonate (DBC). In addition, gammabutyrolactone, sulfolane, ethyl acetate, methyl acetate, methyl propionate, and other various types of ether, ester, and amide solvents may be additionally used.

The energy storage device 100 having the above structure may consist of an electric double layer capacitor (EDLC) which is driven by using electric double layer charging using activated carbon as a charging and discharging reaction mechanism. Otherwise, the energy storage device 100 may consist of a lithium ion capacitor (LIC) which uses a lithium ion (Li+) as a carrier ion of an electrochemical reaction mechanism.

As described above, since the electrolyte composition in accordance with an embodiment of the present invention uses a mixed salt of a lithium salt and an ammonium salt and uses a mixed solvent of cyclic carbonate and a nitrile solvent having high permittivity and remarkably low viscosity compared to linear carbonate as a solvent, it is possible to improve initial capacity and resistance characteristics and cycle life characteristics.

[Embodiment]

Lithium ion capacitor (LIC) cells, which use a commercially available EDLC activated carbon electrode material in a cathode and use a lithium ion battery (LIB) graphite electrode material doped with lithium in an anode, are manufactured as in the following Tables 1, 3, and 5. After performing initial characteristic and cycle life tests (50,000 cycle) of comparative examples and embodiments shown in these Tables at room temperature, the test results are summarized in Tables 2, 4, and 6, respectively.

The cathode and the anode are manufactured by mixing an active material: an AB conducting agent: a PVDF binder at a ratio of 80:10:10 to prepare mixed slurry and coating and vacuum drying the slurry. The respective electrodes are cut to a size of 100 mm×100 mm and stacked to manufacture an energy storage device. At this time, capacity and resistance characteristics are evaluated by performing a charging and discharging cycle at a rate of 100 C in an operating voltage range of 2.2 to 3.8V, and the evaluation results are summarized in Tables, 2, 4, and 6, respectively.

TABLE 1

| Classification | Electrolyte composition | |
|---|---|---|
| | Electrolyte salt | Solvent |
| Embodiment 1-1 | 1.0M LiPF6 + 0.5M TEABF4 | EC:PC:ACN = 2:1:7 |
| Embodiment 1-2 | 1.0M LiPF6 | EC:PC:ACN = 2:1:7 |
| Comparative example 1-1 | 1.0M LiPF6 | EC:ACN = 3:7 |
| Comparative example 1-2 | 1.0M LiPF6 | EC:PC:EMC = 2:1:7 |

TABLE 2

| Classification | Initial characteristic evaluation results | | Characteristic evaluation results after life test (50,000 cycle) | | |
|---|---|---|---|---|---|
| | Capacitance (F) | Resistance 1 kHz (mΩ) | Capacitance | Resistance 1 kHz (mΩ) | Remarks (%) |
| Embodiment 1-1 | 2244 | 0.67 | 1930 | 1.13 | $C/C_0 = 86$, $R/R_0 = 168$ |
| Embodiment 1-2 | 2105 | 0.81 | 1726 | 1.47 | $C/C_0 = 82$, $R/R_0 = 181$ |
| Comparative example 1-1 | 2101 | 0.76 | 1576 | 1.67 | $C/C_0 = 75$, $R/R_0 = 220$ |
| Comparative example 1-2 | 2015 | 1.23 | 1451 | 3.49 | $C/C_0 = 72$, $R/R_0 = 284$ |

Referring to Tables 2 and 3, when comparing the embodiment 1-1 and the embodiment 1-2, compared to the electrolyte composition containing only the lithium salt, the initial capacity and cycle life characteristics of the electrolyte composition using the mixed salt of the lithium salt and the ammonium salt are improved, and both of the embodiment 1-1 and the embodiment 1-2 exhibit the improved characteristics compared to the comparative example 1-1 and the comparative example 1-2. When comparing the embodiment 1-2 and the comparative example 1-1, the resistance and cycle life characteristics are improved when reducing the ratio of ethylene carbonate (EC) and mixing a certain amount of propylene carbonate (PC) in the electrolyte composition. Further, when comparing the embodiment 1-2 and the comparative example 1-2, the initial capacity, resistance, and cycle life characteristics are improved when replacing ethyl methyl carbonate (EMC), which is low viscosity linear carbonate mixed in cyclic carbonate (EC,PC) to maintain the electrolyte composition in a liquid state and improve conductivity and viscosity, with acetonitrile (ACN).

Accordingly, the initial capacity and cycle life characteristics are most significantly improved when using the mixed salt of the lithium salt and the ammonium salt as the electrolyte composition and using the nitrile solvent in the cyclic carbonate solvent instead of the linear carbonate solvent.

TABLE 3

| Classification | Electrolyte salt | | Mixed solvent | |
|---|---|---|---|---|
| | Lithium salt | Ammonium salt | EC:PC mixing ratio | ACN content |
| Comparative example 2-1 | 0.1M LiPF6 | 0.5M TEABF4 | 2:1 | 10 wt % |
| Comparative example 2-2 | 0.1M LiPF6 | 0.5M TEABF4 | 2:1 | 20 wt % |
| Embodiment 2-1 | 0.1M LiPF6 | 0.5M TEABF4 | 2:1 | 30 wt % |
| Embodiment 2-2 | 0.1M LiPF6 | 0.5M TEABF4 | 2:1 | 40 wt % |
| Embodiment 2-3 | 0.1M LiPF6 | 0.5M TEABF4 | 2:1 | 50 wt % |
| Embodiment 2-4 | 0.1M LiPF6 | 0.5M TEABF4 | 2:1 | 60 wt % |
| Embodiment 2-5 | 0.1M LiPF6 | 0.5M TEABF4 | 2:1 | 70 wt % |
| Embodiment 2-6 | 0.1M LiPF6 | 0.5M TEABF4 | 2:1 | 80 wt % |
| Embodiment 2-7 | 0.1M LiPF6 | 0.5M TEABF4 | 2:1 | 90 wt % |
| Comparative example 2-3 | 0.1M LiPF6 | 0.5M TEABF4 | None | 100 wt % |

TABLE 4

| Classification | Initial characteristic evaluation results | | Characteristic evaluation results after life test (50,000 cycle) | | |
|---|---|---|---|---|---|
| | Capacitance (F) | Resistance 1 kHz (mΩ) | Capacitance | Resistance 1 kHz (mΩ) | Remarks (%) |
| Comparative example 2-1 | 1,108 | 7.11 | 310 | 47.49 | $C/C_0 = 28$, $R/R_0 = 668$ |
| Comparative example 2-2 | 1,755 | 3.01 | 860 | 13.60 | $C/C_0 = 49$, $R/R_0 = 452$ |
| Embodiment 2-1 | 2,168 | 1.04 | 1,626 | 2.48 | $C/C_0 = 75$, $R/R_0 = 238$ |
| Embodiment 2-2 | 2,206 | 0.86 | 1,765 | 1.71 | $C/C_0 = 80$, $R/R_0 = 199$ |
| Embodiment 2-3 | 2,227 | 0.74 | 1,848 | 1.34 | $C/C_0 = 83$, $R/R_0 = 181$ |
| Embodiment 2-4 | 2,239 | 0.69 | 1,945 | 1.19 | $C/C_0 = 87$, $R/R_0 = 172$ |
| Embodiment 2-5 | 2,244 | 0.67 | 1,930 | 1.13 | $C/C_0 = 86$, $R/R_0 = 168$ |
| Embodiment 2-6 | 2,245 | 0.69 | 1,908 | 1.19 | $C/C_0 = 85$, $R/R_0 = 173$ |
| Embodiment 2-7 | 2,244 | 0.68 | 1,818 | 1.28 | $C/C_0 = 81$, $R/R_0 = 188$ |
| Comparative example 2-3 | 2,228 | 0.70 | 1,359 | 1.74 | $C/C_0 = 61$, $R/R_0 = 248$ |

Referring to Tables 3 and 4, the tests are performed by using the mixed salt of the lithium salt and the ammonium salt and using ethylene carbonate (EC) and propylene carbonate (PC) as a basic solvent while adjusting the content of acetonitrile (ACN) which is a nitrile solvent. As a result, when adding more than a certain amount of the acetonitrile solvent, the initial capacity and resistance characteristics are improved. In particular, when comparing the embodiments 2-1 to 2-7 and the comparative examples 3-1 to 2-3, the initial capacity and resistance characteristics are remarkably improved and the cycle life characteristics are greatly improved when the content of acetonitrile is about 30 to 90 wt % based on the total mixed solvent composition constituting the electrolyte.

TABLE 5

| Classification | Electrolyte salt | | Mixed solvent | |
|---|---|---|---|---|
| | Lithium salt | Ammonium salt | EC:PC mixing ratio | ACN content |
| Comparative example 3-1 | 0.1M LiPF6 | 0.5M TEABF4 | 1:4 | 60 wt % |

TABLE 5-continued

| | Electrolyte salt | | Mixed solvent | |
| --- | --- | --- | --- | --- |
| | | | EC:PC | |
| Classification | Lithium salt | Ammonium salt | mixing ratio | ACN content |
| Comparative example 3-2 | 0.1M LiPF6 | 0.5M TEABF4 | 1:2 | 60 wt % |
| Embodiment 3-1 | 0.1M LiPF6 | 0.5M TEABF4 | 1:1 | 60 wt % |
| Embodiment 3-2 | 0.1M LiPF6 | 0.5M TEABF4 | 2:1 | 60 wt % |
| Embodiment 3-3 | 0.1M LiPF6 | 0.5M TEABF4 | 4:1 | 60 wt % |
| Embodiment 3-4 | 0.1M LiPF6 | 0.5M TEABF4 | 6:1 | 60 wt % |
| Embodiment 3-5 | 0.1M LiPF6 | 0.5M TEABF4 | 8:1 | 60 wt % |
| Comparative example 3-3 | 0.1M LiPF6 | 0.5M TEABF4 | 10:1 | 60 wt % |
| Comparative example 3-4 | 0.1M LiPF6 | 0.5M TEABF4 | 10:0 (No PC) | 60 wt % |

TABLE 6

| | Initial characteristic evaluation results | | Characteristic evaluation results after life test (50,000 cycle) | | |
| --- | --- | --- | --- | --- | --- |
| Classification | Capacitance (F) | Resistance 1 kHz (mΩ) | Capacitance | Resistance 1 kHz (mΩ) | Remarks (%) |
| Comparative example 3-1 | 2237 | 0.71 | 1297 | 2.02 | $C/C_0 = 58$, $R/R_0 = 285$ |
| Comparative example 3-2 | 2241 | 0.69 | 1591 | 1.39 | $C/C_0 = 71$, $R/R_0 = 202$ |
| Embodiment 3-1 | 2250 | 0.66 | 1845 | 1.17 | $C/C_0 = 82$, $R/R_0 = 178$ |
| Embodiment 3-2 | 2249 | 0.67 | 1911 | 1.13 | $C/C_0 = 85$, $R/R_0 = 169$ |
| Embodiment 3-3 | 2248 | 0.68 | 1933 | 1.12 | $C/C_0 = 86$, $R/R_0 = 165$ |
| Embodiment 3-4 | 2247 | 0.68 | 1865 | 1.14 | $C/C_0 = 83$, $R/R_0 = 168$ |
| Embodiment 3-5 | 2244 | 0.70 | 1772 | 1.25 | $C/C_0 = 79$, $R/R_0 = 179$ |
| Comparative example 3-3 | 2239 | 0.72 | 1522 | 1.64 | $C/C_0 = 68$, $R/R_0 = 228$ |
| Comparative example 3-4 | 2236 | 0.74 | 1207 | 1.96 | $C/C_0 = 54$, $R/R_0 = 265$ |

Referring to Tables 5 and 6, the tests are performed by using the mixed salt of the lithium salt and the ammonium salt and using ethylene carbonate (EC), propylene carbonate (PC), and acetonitrile (ACN) as a basic solvent while adjusting the relative contents of ethylene carbonate (EC) and propylene carbonate (PC). As a result, the cycle life characteristics are improved when adjusting the mixing ratio of ethylene carbonate and propylene carbonate to a certain ratio. In particular, when comparing the embodiments 3-1 to 3-5 and the comparative examples 3-1 to 3-4, the cycle life characteristics are greatly improved when the mixing ratio of ethylene carbonate and propylene carbonate is adjusted to about 1:1 to 8:1.

Further, according to the above-described embodiments, one of the lithium salt and the ammonium salt may be independently used as the electrolyte salt constituting the electrolyte. At this time, the molar concentration of the lithium salt or the ammonium salt may be 0.1 to 2.0M. Further, the lithium salt and the ammonium salt may be mixed to be used as the electrolyte salt constituting the electrolyte. In particular, when manufacturing an LIC cell, as for the electrolyte salt constituting the electrolyte, the lithium salt and the ammonium salt may be mixed at a mixing ratio (based on molar concentration) of 5:5 to 9:1 to improve the characteristics. In the embodiment 1-1 that uses the mixture of the lithium salt and the ammonium salt, the initial capacity and resistance characteristics are more improved and the cycle life characteristics are greatly improved compared to the embodiment 1-2 that uses the lithium salt independently.

As described above, in the electrolyte composition in accordance with the present invention, when using the nitrile solvent (ACN), which has high permittivity and remarkably low viscosity compared to the typical carbonate solvent, instead of low viscosity linear carbonate (EMC) mixed to maintain the electrolyte composition in a liquid state and improve conductivity and viscosity, the initial capacity and resistance characteristics are remarkably excellent and the cycle life characteristics are improved. In particular, when using the mixed salt of the lithium salt and the ammonium salt, adjusting the total content of the nitrile solvent among the solvents constituting the electrolyte to about 30 to 90 wt % based on the total mixed solvent composition, and adjusting the mixing ratio of ethylene carbonate and propylene carbonate to 1:1 to 8:1, the initial capacity, resistance, and cycle life characteristics are greatly improved.

The electrolyte composition in accordance with an embodiment of the present invention can improve initial capacity, resistance, and cycle life characteristics of an energy storage device by using a mixed salt of a lithium salt and an ammonium salt and using a mixed solvent of cyclic carbonate and a nitrile solvent having high permittivity and remarkably low viscosity compared to linear carbonate as a solvent.

The energy storage device in accordance with an embodiment of the present invention can improve initial capacity, resistance, and cycle life characteristics of an energy storage device by using an electrolyte composition which uses a mixed salt of a lithium salt and an ammonium salt and uses a mixed solvent of cyclic carbonate and a nitrile solvent having high permittivity and remarkably low viscosity compared to linear carbonate as a solvent.

The foregoing description illustrates the present invention. Additionally, the foregoing description shows and explains only the preferred embodiments of the present invention, but it is to be understood that the present invention is capable of use in various other combinations, modifications, and environments and is capable of changes and modifications within the scope of the inventive concept as expressed herein, commensurate with the above teachings and/or the skill or knowledge of the related art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. An electrolyte composition comprising:
   an electrolyte salt including a lithium salt and an ammonium salt;
   a carbonate solvent; and
   at least one nitrile solvent of acetonitrile and propionitrile.

2. The electrolyte composition according to claim 1, wherein the content of the nitrile solvent is 30 to 90 wt % based on the total mixed solvent included in the electrolyte composition.

3. The electrolyte composition according to claim 1, wherein the carbonate solvent comprises a cyclic carbonate solvent.

4. The electrolyte composition according to claim 1, wherein the carbonate solvent is a cyclic carbonate solvent, and the content of the cyclic carbonate solvent is 10 to 70 wt % based on the total mixed solvent included in the electrolyte composition.

5. The electrolyte composition according to claim 1, wherein the carbonate solvent comprises ethylene carbonate and propylene carbonate, wherein a mixing ratio of the ethylene carbonate and the propylene carbonate is 1:1 to 8:1.

6. The electrolyte composition according to claim 1, wherein a mixing ratio of the lithium salt and the ammonium salt is 5:5 to 9:1.

7. The electrolyte composition according to claim 1, wherein the concentration of the lithium salt and the ammonium salt is 0.1 to 2.0M based on the electrolyte.

8. The electrolyte composition according to claim 1, wherein the lithium salt comprises at least one of $LiPF_6$, $LiBF_4$, $LiSbF_6$, $LiAsF_5$, $LiClO_4$, $LiCF_3SO_3$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso\text{-}C_3F_7)_3$, $LiPF_5(iso\text{-}C_3F_7)$, $(CF_2)_2(SO_2)_2NLi$, and $(CF_2)_3(SO_2)_2NLi$.

9. The electrolyte composition according to claim 1, wherein the ammonium salt comprises at least one of tetraethyl ammonium tetrafluoroborate (TEABF4), triethylmethyl ammonium tetrafluoroborate (TEMABF4), diethyldimethyl ammonium tetrafluoroborate (DEDMABF4), diethylmethyl-methoxyethyl ammonium tetrafluoroborate (DEMEBF4), spirobipyrrolidinium tetrafluoroborate (SBPBF4), and spiropiperidinepyrrolidinium tetrafluoroborate (SPPBF4).

10. An energy storage device comprising:
a cathode;
an anode; and
an electrolyte composition, wherein the electrolyte composition comprises an electrolyte salt including a lithium salt and an ammonium salt, a carbonate solvent, and at least one nitrile solvent of acetonitrile and propionitrile.

11. The energy storage device according to claim 10, wherein the content of the nitrile solvent is 30 to 90 wt % based on the total mixed solvent included in the electrolyte composition.

12. The energy storage device according to claim 10, wherein the carbonate solvent comprises a cyclic carbonate solvent.

13. The energy storage device according to claim 10, wherein the carbonate solvent is a cyclic carbonate solvent, and the content of the cyclic carbonate solvent is 10 to 70 wt % based on the total mixed solvent included in the electrolyte composition.

14. The energy storage device according to claim 10, wherein the carbonate solvent comprises ethylene carbonate and propylene carbonate, wherein a mixing ratio of the ethylene carbonate and the propylene carbonate is 1:1 to 8:1.

15. The energy storage device according to claim 10, wherein a mixing ratio of the lithium salt and the ammonium salt is 5:5 to 9:1.

16. The energy storage device according to claim 10, wherein the concentration of the lithium salt and the ammonium salt is 0.1 to 2.0M based on the electrolyte.

* * * * *